(12) United States Patent
Murakami et al.

(10) Patent No.: US 10,396,886 B2
(45) Date of Patent: Aug. 27, 2019

(54) RELAY DEVICE REWRITING A DESTINATION ADDRESS BASED ON CONFIGURATION OF A MULTI-HOP NETWORK

(71) Applicant: Kabushiki Kaisha Toshiba, Minato-ku (JP)

(72) Inventors: Takaomi Murakami, Kawasaki (JP); Takuya Kawamura, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/664,054

(22) Filed: Jul. 31, 2017

(65) Prior Publication Data

US 2018/0145743 A1 May 24, 2018

(30) Foreign Application Priority Data

Nov. 18, 2016 (JP) .................................. 2016-225360

(51) Int. Cl.
*H04B 7/15* (2006.01)
*H04W 40/02* (2009.01)
(Continued)

(52) U.S. Cl.
CPC .............. *H04B 7/15* (2013.01); *H04W 24/08* (2013.01); *H04W 40/02* (2013.01); *H04W 88/04* (2013.01)

(58) Field of Classification Search
CPC ..... H04W 84/18; H04W 88/04; H04W 40/02; H04W 40/24; H04W 40/22; H04W 8/26;
(Continued)

(56) References Cited

U.S. PATENT DOCUMENTS

| 2009/0303931 A1 | 12/2009 | Yamauchi |
| 2010/0074119 A1 | 3/2010 | Krishnaswamy |
| 2015/0134964 A1* | 5/2015 | Sakemi ................. H04L 63/065 |
| | | 713/171 |

FOREIGN PATENT DOCUMENTS

| JP | 2008-294605 | 12/2008 |
| JP | 2009-278557 | 11/2009 |
(Continued)

*Primary Examiner* — Philip Sobutka
(74) *Attorney, Agent, or Firm* — Oblon, McClelland, Maier & Neustadt, L.L.P.

(57) ABSTRACT

According to an embodiment, a relay device includes a reception unit, a collection unit, a determination unit, a rewriting unit, and a transmission unit. The reception unit is configured to receive a wireless frame transmitted between a plurality of communication devices. The collection unit is configured to collect configuration information indicating a configuration of a wireless multi-hop network from the communication devices. The determination unit is configured to determine whether to relay the wireless frame on the basis of the configuration information. the rewriting unit is configured to rewrite a transmission destination address of the wireless frame to an address of the communication device of a relay destination specified on the basis of the configuration information and rewrite a transmission source address of the wireless frame to an address of the own device. The transmission unit is configured to transmit the wireless frame rewritten by the rewriting unit.

11 Claims, 12 Drawing Sheets

(51) Int. Cl.
*H04W 24/08* (2009.01)
*H04W 88/04* (2009.01)

(58) Field of Classification Search
CPC . H04W 16/26; H04W 84/047; H04W 40/005;
H04W 40/246; H04W 40/28; H04W
40/30; H04W 76/10; H04W 84/12; H04W
84/20; H04B 7/15; H04B 7/14; H04B
7/15507; H04B 7/15592; H04B 7/15528;
H04B 1/7143; H04B 3/36
USPC ....... 455/7–25; 370/338, 389, 392, 315, 349
See application file for complete search history.

(56) References Cited

FOREIGN PATENT DOCUMENTS

| | | |
|---|---|---|
| JP | 2009-296435 | 12/2009 |
| JP | 2013-223014 | 10/2013 |
| JP | 2016-015730 | 1/2016 |
| WO | WO 2014/068665 A1 | 5/2014 |

\* cited by examiner

→ DATA TRANSMITTED THROUGH WIRELESS MULTI-HOP NETWORK
----▶ DATA TRANSMITTED VIA RELAY DEVICE

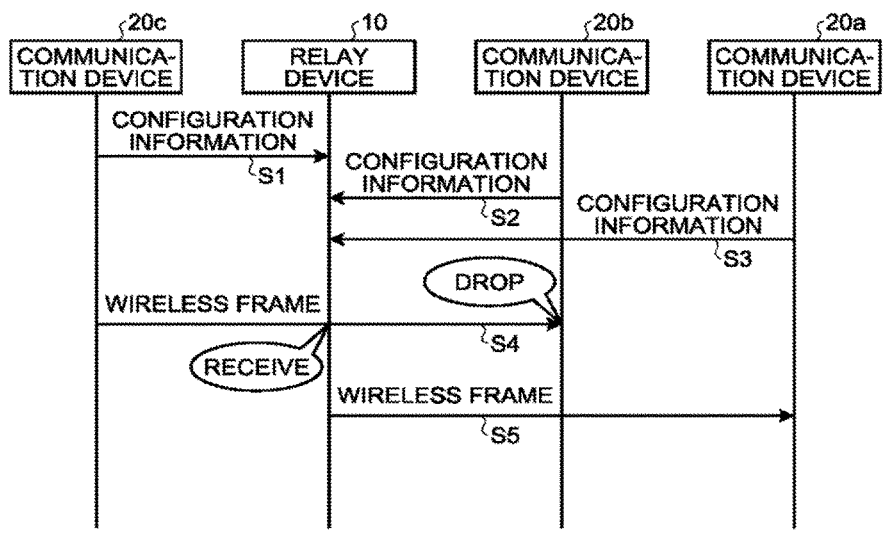

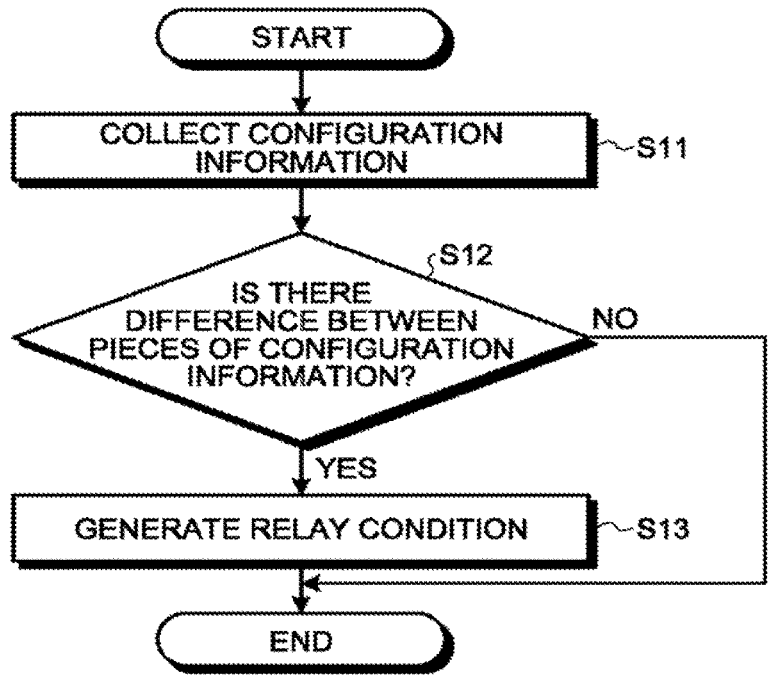
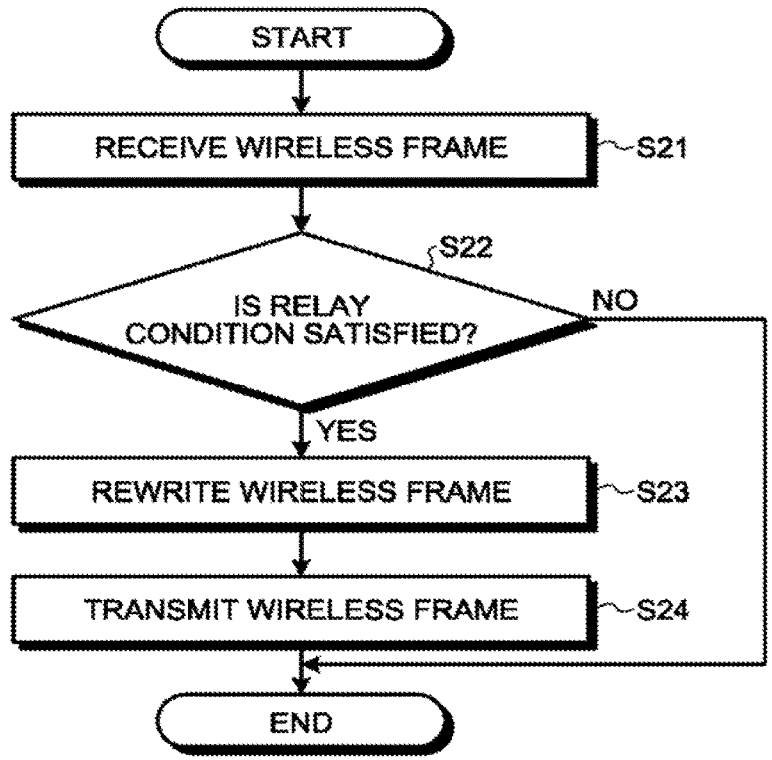

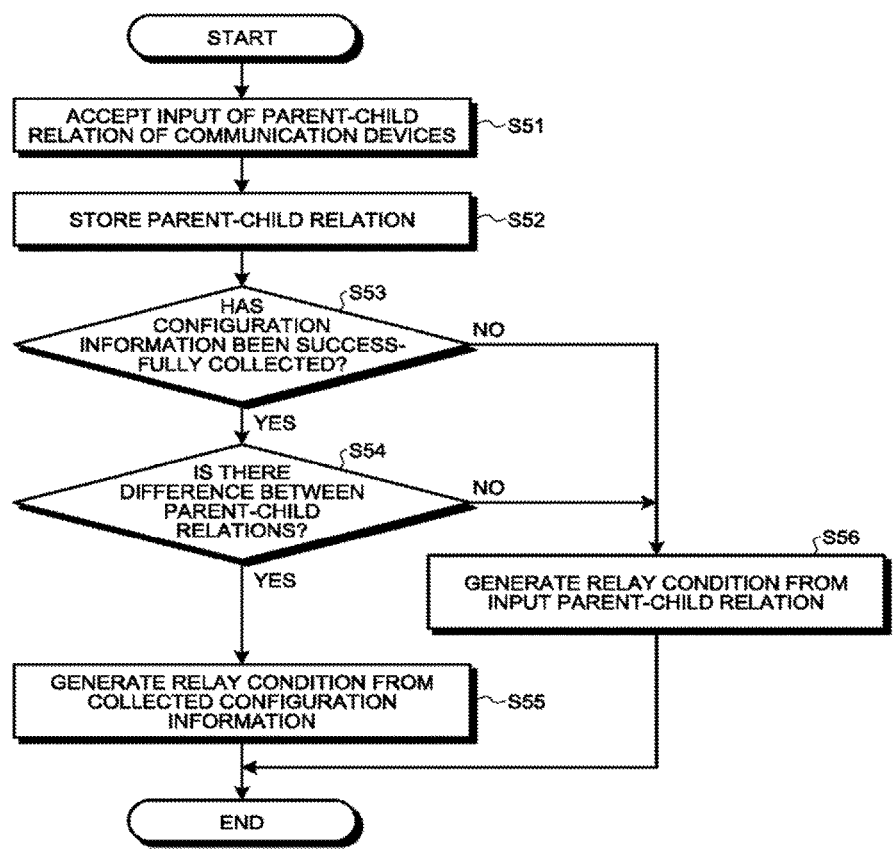

FIG.19A

| TRANSMISSION SOURCE ADDRESS: | dd:dd:dd:dd:dd:dd |
|---|---|
| TRANSMISSION DESTINATION ADDRESS: | bb:bb:bb:bb:bb:bb |

FIG.19B

| TRANSMISSION SOURCE ADDRESS: | dd:dd:dd:dd:dd:dd |
|---|---|
| TRANSMISSION DESTINATION ADDRESS: | ee:ee:ee:ee:ee:ee |

RELAY DEVICE REWRITING A DESTINATION ADDRESS BASED ON CONFIGURATION OF A MULTI-HOP NETWORK

CROSS-REFERENCE TO RELATED APPLICATIONS

This application is based upon and claims the benefit of priority from Japanese Patent Application No. 2016-225360, filed on Nov. 18, 2016; the entire contents of which are incorporated herein by reference.

FIELD

Embodiments described herein relate generally to a relay device, a communication system, and a computer program product.

BACKGROUND

Relay devices that relay wireless frames have conventionally been known. One example of the conventionally known relay devices is disposed between communication devices with a low-quality wireless link to relay the wireless frame.

However, in the conventional technique, it has been difficult to relay the wireless frame without a transmission delay.

BRIEF DESCRIPTION OF THE DRAWINGS

FIG. 5 is a diagram illustrating an example of rewriting addresses in the first embodiment;

FIG. 6 is a sequence diagram illustrating a communication example in the first embodiment;

FIG. 7 is a flowchart illustrating an example of a process of generating a relay condition in the first embodiment;

FIG. 8 is a flowchart illustrating an example of a relay process in the first embodiment;

FIG. 13 is a diagram illustrating an input example of a parent-child relation according to a fourth embodiment;

FIG. 14 is a flowchart illustrating an example of a process of generating a relay condition in the fourth embodiment;

FIG. 19A is a diagram illustrating an input, example 1 of control information according to a sixth embodiment;

FIG. 19B is a diagram illustrating an input example 2 of control information in the sixth embodiment;

DETAILED DESCRIPTION

According to an embodiment, a relay device includes a reception unit, a collection unit, a determination unit, a rewriting unit, and a transmission unit. The reception unit is configured to receive a wireless frame transmitted between a plurality of communication devices. The collection unit is configured to collect configuration information indicating a configuration of a wireless multi-hop network from the communication devices. The determination unit is configured to determine whether to relay the wireless frame on the basis of the configuration information. the rewriting unit is configured to, when the wireless frame is to be relayed, rewrite a transmission destination address of the wireless frame to an address of the communication device of a relay destination specified on the basis of the configuration information and rewrite a transmission source address of the wireless frame to an address of the own device. The transmission unit is configured to transmit the wireless frame rewritten by the rewriting unit.

Embodiments of a relay device, a communication system, and a computer program product will be described in detail with reference to the attached drawings.

First Embodiment

First, one example of a device configuration of a communication system according to a first embodiment is described.

Device Configuration of Communication System

Figure 1:
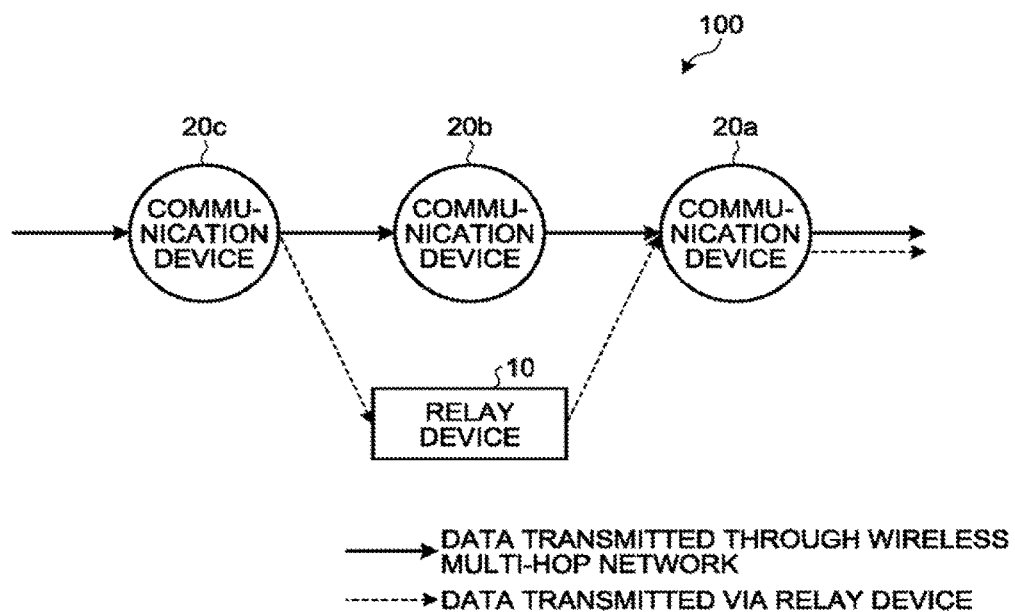
FIG. 1 is a diagram illustrating an example of a device configuration of a communication system according to a first embodiment.

FIG. 1 is a block diagram illustrating a device configuration of a communication system 100 in the first embodiment. The communication system 100 in the first embodiment includes a relay device 10 and a plurality of communication devices 20. The number of communication devices 20 may be any number. In the example of FIG. 1, three communication devices 20a to 20c are illustrated for explanation.

The relay device 10 receives a wireless frame transmitted between the communication devices 20a to 20c, and determines whether to relay the wireless frame.

The communication devices 20a to 20c form a wireless multi-hop network. Note that the relay device 10 does not belong to the wireless multi-hop network. That is to say, the relay device 10 does not operate as the communication device 20 that forms the wireless multi-hop network. The relay device 10 is disposed in a range where the communication with the communication devices 20a to 20c is possible. Thus, the relay device 10 receives the wireless frame that is not the wireless frame addressed to the own device.

In the example of FIG. 1, if the relay device 10 relays the wireless frame, the communication device 20b is bypassed. Accordingly, the relay device 10 can relay the wireless frame without increasing the number of hops.

The communication devices 20a to 20c are simply referred to as the communication devices 20 unless the devices need to be distinguished.

Next, an example of the functional configuration of the relay device 10 in the first embodiment is described.

Functional Configuration of Relay Device

Figure 2:
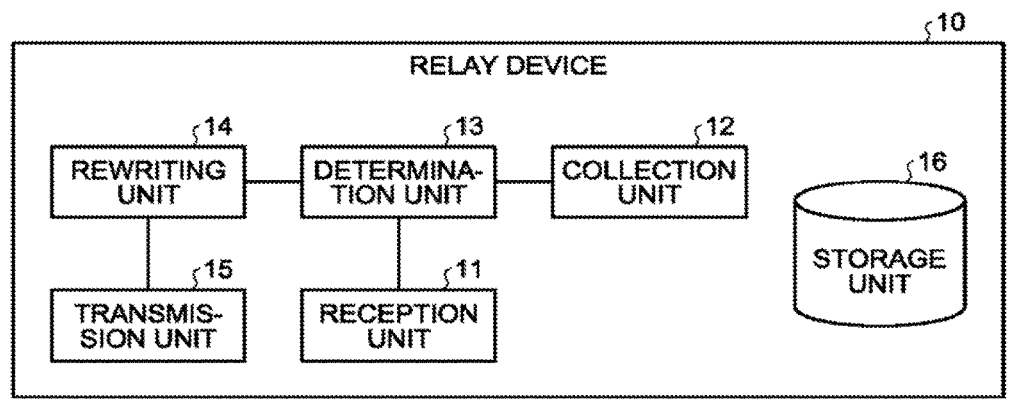
FIG. 2 is a diagram illustrating an example of a functional configuration of a relay device in the first embodiment.

FIG. 2 illustrates an example of the functional configuration of the relay device 10 in the first embodiment. The relay device 10 in the first embodiment includes a reception unit 11, a collection unit 12, a determination unit 13, a rewriting unit 14, a transmission unit 15, and a storage unit 16.

The reception unit 11 receives the wireless frame transmitted between the plurality of communication devices 20.

The collection unit 12 collects the configuration information indicating the configuration of the wireless multi-hop network from the communication devices 20. Specifically, the collection unit 12 receives the configuration information from the communication devices 20 that each have a wireless link with the relay device 10. In the example of FIG. 1, the communication devices 20 that each have a wireless link with the relay device 10 are the communication devices 20a to 20c.

The configuration information includes, for example, the address of the communication device 20, the rank value in the wireless multi-hop network, the parent-child relation on the wireless multi-hop network, and the like.

The rank value indicates the relay cost. The rank value is expressed in numerals, for example.

The parent-child relation is expressed by, for example, the pair of the address of a certain communication device 20 and the address of the communication device 20 to be a parent of the certain communication device 20. The rank value of the communication device 20 serving as the parent is smaller than the rank value of the communication device 20 serving as the child.

The rank value and the parent-child relation can be obtained by, for example, reading a particular field such as a DODAG information object (DIO) or a destination advertisement object (DAO) of an IPv6 Routing Protocol for Low-Power and Lossy Networks (RPL), which is defined by RFC 6550.

Figures 3, 4:
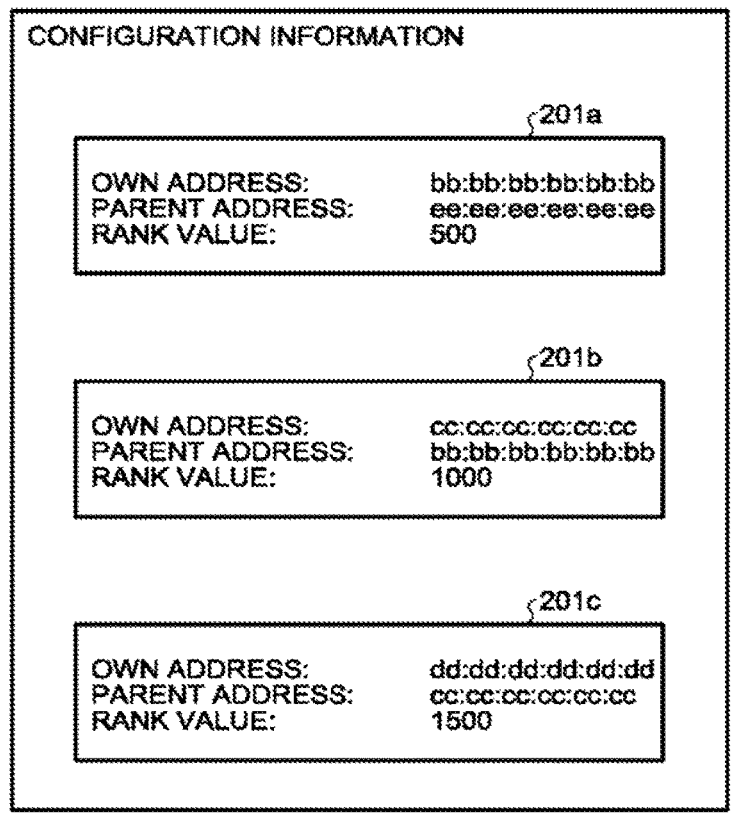
FIG. 3 is a diagram illustrating an example of configuration information in the first embodiment.
FIG. 4 is a diagram illustrating an example of a relay condition in the first embodiment.

FIG. 3 illustrates an example of the configuration information in the first embodiment. The example of FIG. 3 illustrates configuration information 201a transmitted from the communication device 20a, configuration information 201b transmitted from the communication device 20b, and configuration information 201c transmitted from the communication device 20c.

The configuration information 201b will be described as an example. The configuration information 201b includes an own address (cc:cc:cc:cc:cc:cc), a parent address (bb:bb:bb:bb:bb:bb), and a rank value (1000). The own address indicates the address of the communication device 20b. The parent address represents the address of the device serving as the parent of the communication device 20b. In the example of FIG. 3, the device to be the parent of the communication device 20b is the communication device 20a.

The description of the configuration information 201a and 201c is similar to the description of the configuration information 201b.

By the configuration information 201a to 201c collected by the collection unit 12, it can be identified that the parent of the communication device 20b is the communication device 20a and the parent of the communication device 20c is the communication device 20b. That is to say, the configuration of the wireless multi-hop network can be identified from the configuration information 201a to 201c.

Back to FIG. 2, the determination unit 13 determines whether to relay the wireless frame on the basis of the configuration information. Specifically, the determination unit 13 generates a relay condition from the configuration information, and if the wireless frame satisfies the relay condition, the determination unit 13 determines to relay the wireless frame.

The relay condition includes a transmission source address and a transmission destination address. Here, an example of a method for generating the relay condition is described.

In the Case Where the Number of Pieces of Configuration Information is One

If the number of pieces of configuration information is one, the determination unit 13 cannot identify the wireless link at the transmission destination, so that the determination unit 13 determines that the relay is impracticable.

In the Case Where the Number of Pieces of Configuration Information is Two

If the number of pieces of configuration information is two, the determination unit 13 determines whether the two communication devices 20 which have transmitted the configuration information are in a direct parent-child relation on the wireless multi-hop network. In the example of FIG. 1, the communication device 20a and the communication device 20b are in a direct parent-child relation. Similarly, the communication device 20b and the communication device 20c are in a direct parent-child relation. On the other hand, the communication device 20a and the communication device 20c are not in a direct parent-child relation.

The determination unit 13 determines that the relay is impracticable if the devices are in a direct parent-child relation. If the devices are not in a direct parent-child relation, the determination unit 13 compares the rank values between the communication devices 20. The determination unit 13 determines the address of the communication device 20 with the larger rank value to be the transmission source address, and the address of the communication device 20 with the smaller rank value as the transmission destination address. Then, the determination unit 13 generates the relay condition in which the determined transmission source address and the determined transmission destination address are associated with each other.

If the transmission source address of the wireless frame and the transmission destination address of the relay condition coincide, the determination unit 13 determines to relay that wireless frame to the transmission destination address of the relay condition.

In the Case Where the Number of Pieces of Configuration Information is Three

If the number of pieces of configuration information is three or more, the determination unit 13 determines the address of the communication device 20 with the smallest rank value to be the transmission destination address, and determines the address of one or more devices that are not in the direct parent-child relation with the communication device 20 (the address of one or more devices that, when the communication device 20 is the parent, are not the direct child of that communication device 20) to be the transmission source address. The determination unit 13 generates the relay condition in which the determined transmission source address and the determined transmission destination address are associated with each other. Note that if the communication device 20 that is not in the direct parent-child relation with the communication device 20 determined to be the transmission source is not present, the determination unit 13 determines that the relay is impracticable.

If the transmission source address of the wireless frame and the transmission source address of the relay condition coincide, the determination unit 13 determines to relay that wireless frame to the transmission destination address of the relay condition.

FIG. 4 illustrates an example of a relay condition 202 in the first embodiment. The example of FIG. 4 illustrates the relay condition 202 generated based on the configuration information 201a to 201c. From the configuration information 201a to 201c, the determination unit 13 identifies that the communication device 20 with the smallest rank value is the communication device 20a. Then, the determination unit 13 sets the address of the communication device 20a (bb:bb:bb:bb:bb:bb) to the transmission destination address of the relay condition 202. Next, the determination unit 13 identifies that the communication device 20c is the device that is not in the direct parent-child relation with the communication device 20a, on the basis of the configuration information 201a to 201c. Then, the determination unit 13 sets the address of the communication device 20c (dd:dd:dd:dd:dd:dd) to the transmission source address of the relay condition 202.

Back to FIG. 2, the rewriting unit 14 rewrites the wireless frame if the wireless frame is to be relayed. Specifically, the rewriting unit 14 rewrites the transmission destination address of the wireless frame to the address of the communication device 20 at the relay destination specified on the basis of the configuration information. The address of the communication device 20 at the relay destination specified on the basis of the configuration information is the transmission destination address of the relay condition. The rewriting unit 14 rewrites the transmission source address of the wireless frame to the address of the own device (relay device 10).

FIG. 5 illustrates an example of rewriting the address in the first embodiment. In the example of FIG. 5, the address is rewritten in the case where the relay is determined according to the relay condition 202 in FIG. 4. Since the transmission source address of the wireless frame before rewriting and the transmission source address of the relay condition 202 (see FIG. 4) coincide, the determination unit 13 determines to relay the wireless frame. The rewriting unit 14 rewrites the transmission source address of the wireless frame to the address of the relay device 10. The rewriting unit 14 rewrites the transmission destination address of the wireless frame to the transmission destination address of the relay condition 202 (see FIG. 4).

Back to FIG. 2, the transmission unit 15 transmits the wireless frame rewritten by the rewriting unit 14. The storage unit 16 stores information. The storage unit 16 stores, for example, the aforementioned configuration information, the aforementioned relay condition, and the like.

Next, a communication example of the first embodiment will be described.

Communication Example

FIG. 6 is a sequence diagram illustrating a communication example of the first embodiment. First, the relay device 10 receives the configuration information from the communication devices 20a to 20c (Step S1 to Step S3).

Next, the communication device 20c transmits the wireless frame addressed to the communication device 20a through the communication device 20b (Step S4). On this occasion, the relay device 10 receives the wireless frame transmitted from the communication device 20c by the process of Step S4.

Next, the relay device 10 transmits the wireless frame, which has been transmitted from the communication device 20c by the process of Step S4, to the communication device 20a (Step S5). Specifically, the wireless frame rewritten by the rewriting unit 14 of the relay device 10 is transmitted to the communication device 20a.

In the example of FIG. 6, the communication device 20b drops the wireless frame transmitted from the communication device 20c by the process of Step S4. The communication device 20b drops the wireless frame if, for example, the process of the own device is heavily burdened. As illustrated in FIG. 6, the communication device 20a can receive the wireless frame from the relay device 10 even when the communication device 20b drops the wireless frame.

If the wireless frame is not dropped in the communication device 20b, the communication device 20a will receive the wireless frame, which is received from the communication device 20b, also from the relay device 10. The communication device 20a can perform an appropriate process such as the process of discarding one of the wireless frames that is redundant.

Process of Generating Relay Condition

FIG. 7 is a flowchart illustrating an example of a process of generating the relay condition in the first embodiment. First, the collection unit 12 collects the aforementioned configuration information (Step S11). Next, the determination unit 13 determines whether there is a difference between pieces of configuration information collected by the process of Step S11 and the configuration information already held in the relay device 10 (Step S12). If there is a difference (Yes at Step S12), the determination unit 13 generates the aforementioned relay condition on the basis of the configuration information collected by the process of Step S11 (Step S13). If there is no difference (No at Step S12), the process ends.

Relay Process

FIG. 8 is a flowchart illustrating an example of the relay process in the first embodiment. First, the reception unit 11 receives the wireless frame transmitted between the plurality of communication devices 20 (Step S21).

Next, the determination unit 13 determines whether the wireless frame received by the process of Step S21 satisfies the relay condition generated from the configuration information (Step S22). Specifically, the determination unit 13 determines whether the transmission source address of the wireless frame received by the process of Step S21 and the transmission source address of the relay condition coincide.

If the relay condition is not satisfied (No at Step S22), the process ends.

If the relay condition is satisfied (Yes at Step S22), the rewriting unit 14 rewrites the wireless frame received by the process of Step S21 (Step S23). Specifically, the rewriting unit 14 rewrites the transmission destination address of the wireless frame to the transmission destination address of the relay condition, and rewrites the transmission source address of the wireless frame to the address of the relay device 10.

Next, the transmission unit 15 transmits the wireless frame rewritten by the process of Step S23 (Step S24).

As described above, by the relay device 10 in the first embodiment, the wireless frame is relayed while bypassing the communication device 20 (see FIG. 1), so that the wireless frame can be relayed without increasing the number of hops. Thus, the transmission delay, the loss, and the like of the wireless frame can be reduced.

In the relay device 10 in the first embodiment, the determination unit 13 determines whether to relay the wireless frame on the basis of the configuration information described above. More specifically, the determination unit 13 determines to relay the wireless frame if the aforementioned relay condition is satisfied. Thus, the effect of reducing the transmission delay of the wireless frame is high as compared to that of the conventional method in which the operation is triggered by the detection of the loss of the wireless frame.

Second Embodiment

Next, a second embodiment will be described. In the description of the second embodiment, the description similar to that of the first embodiment is omitted and the part different from the first embodiment will be described.

Functional Configuration of Relay Device

Figure 9:
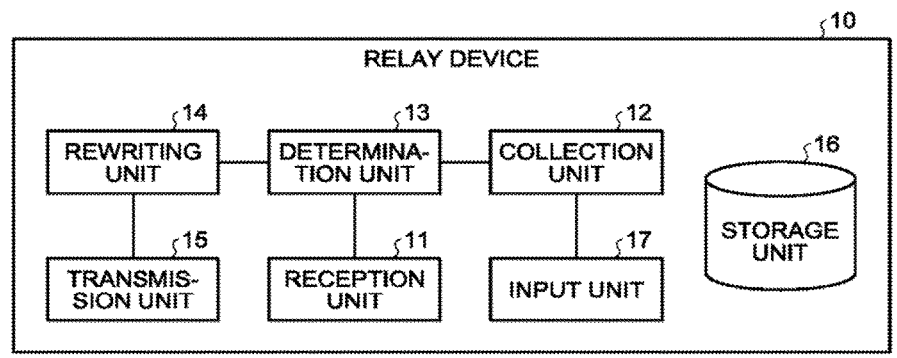
FIG. 9 is a diagram illustrating an example of a functional configuration of a relay device according to a second embodiment.

FIG. 9 illustrates an example of the functional configuration of the relay device 10 in the second embodiment. The relay device 10 in the second embodiment includes the reception unit 11, the collection unit 12, the determination unit 13, the rewriting unit 14, the transmission unit 15, the storage unit 16, and an input unit 17. The relay device 10 in the second embodiment includes the input unit 17 in addition to the functional configuration of the relay device 10 in the first embodiment.

If the relay device 10 includes an input device, for example, the input unit 17 may be achieved by the input device. In another example, the input unit 17 may be achieved by a communication interface (IF) that receives the information through a network from another device.

The input unit 17 accepts the input of the rank value of the wireless multi-hop network. The input format of the rank value may be arbitrarily determined. The input format of the rank value may be, for example, the pair of the type that identifies the rank value and the numerals that express the rank value (rank value: 1000, for example). The storage unit 16 stores the rank value accepted by the input unit 17.

The determination unit 13 determines the address of the communication device 20, which has transmitted the configuration information including the rank value smaller than the rank value input through the input unit 17, to be the transmission destination address, and determines the address of the communication device 20, which has transmitted the configuration information including the rank value larger than the rank value input through the input unit 17, to be the transmission source address. Then, the determination unit 13 generates the relay condition in which the determined transmission source address and the determined transmission destination address are associated with each other.

Description is made of an example in which the rank value input through the input unit 17 is 1000 and the configuration information illustrated in FIG. 3 is collected. The configuration information 201a transmitted by the communication device 20a includes the rank value (500) smaller than the rank value (1000) input through the input unit 17. The configuration information 201c transmitted by the communication device 20c includes the rank value (1500) larger than the rank value (1000) input through the input unit 17.

Therefore, the determination unit 13 sets the address (bb:bb:bb:bb:bb:bb) of the communication device 20a to the transmission destination address of the relay condition. Moreover, the determination unit 13 sets the address (dd:dd:dd:dd:dd:dd) of the communication device 20c to the transmission source address of the relay condition. That is to say, the same relay condition as the relay condition 202 in the first embodiment (see FIG. 4) can be generated.

Process of Generating Relay Condition

Figure 10:
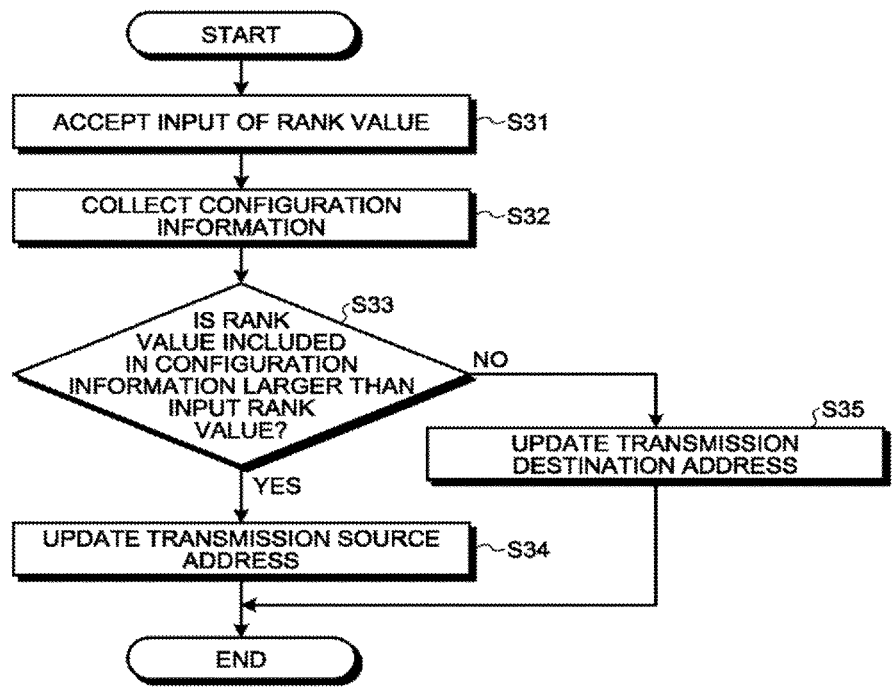
FIG. 10 is a flowchart illustrating an example of a process of generating a relay condition in the second embodiment.

FIG. 10 is a flowchart illustrating a process of generating the relay condition in the second embodiment. First, the input unit 17 accepts the input of the rank value of the wireless multi-hop network (Step S31). Next, the collection unit 12 collects the configuration information indicating the configuration of the wireless multi-hop network from the communication device 20 (Step S32).

Next, the determination unit 13 determines whether the rank value included in the configuration information collected by the process of Step S32 is larger than the rank value input by the process of Step S31 (Step S33).

If the rank value included in the configuration information is larger than the input rank value (Yes at Step S33), the determination unit 13 updates the transmission source address of the relay condition to the address of the communication device 20 that has transmitted the configuration information (the own address included in the configuration information) (Step S34).

If the rank value included in the configuration information is smaller than the input rank value (No Step S33), the determination unit 13 updates the transmission destination address of the relay condition to the address of the communication device 20 that has transmitted the configuration information (the own address included in the configuration information) (Step S35).

As described, above, in the relay device 10 in the second embodiment, the input unit 17 accepts the input of the rank value in advance. Thus, the wireless frame can be relayed without, examining the parent-child relation of the plurality of communication devices 20 included in the wireless multi-hop network by the method described in the first embodiment.

Third Embodiment

Next, a third embodiment is described. In the description of the third embodiment, the description similar to that of the second embodiment is omitted and the part different from the second embodiment will be described.

Functional Configuration of Relay Device

The functional configuration of the relay device 10 in the third embodiment is the same as the functional configuration of the relay device 10 in the second embodiment (see FIG. 9). However, the input unit 17 accepts the input of the address of the communication device 20 as the transmission source address of the relay condition. The storage unit 16 stores the address of the communication device 20 accepted by the input unit 17, as the transmission source address of the relay condition.

Example of Address Input

Figure 11:
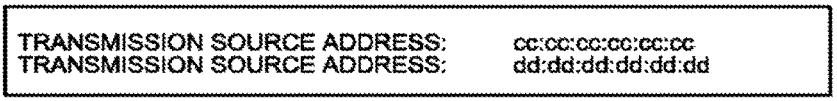
FIG. 11 is a diagram illustrating an input example of addresses according to a third embodiment.

FIG. 11 illustrates an example of the address input in the third embodiment. FIG. 11 illustrates the example in which the address input is accepted by the pair of "the transmission source address" indicating the type of the input value and the address value. As illustrated in FIG. 11, a plurality of address inputs may be accepted.

Process of Generating Relay Condition

Figure 12:
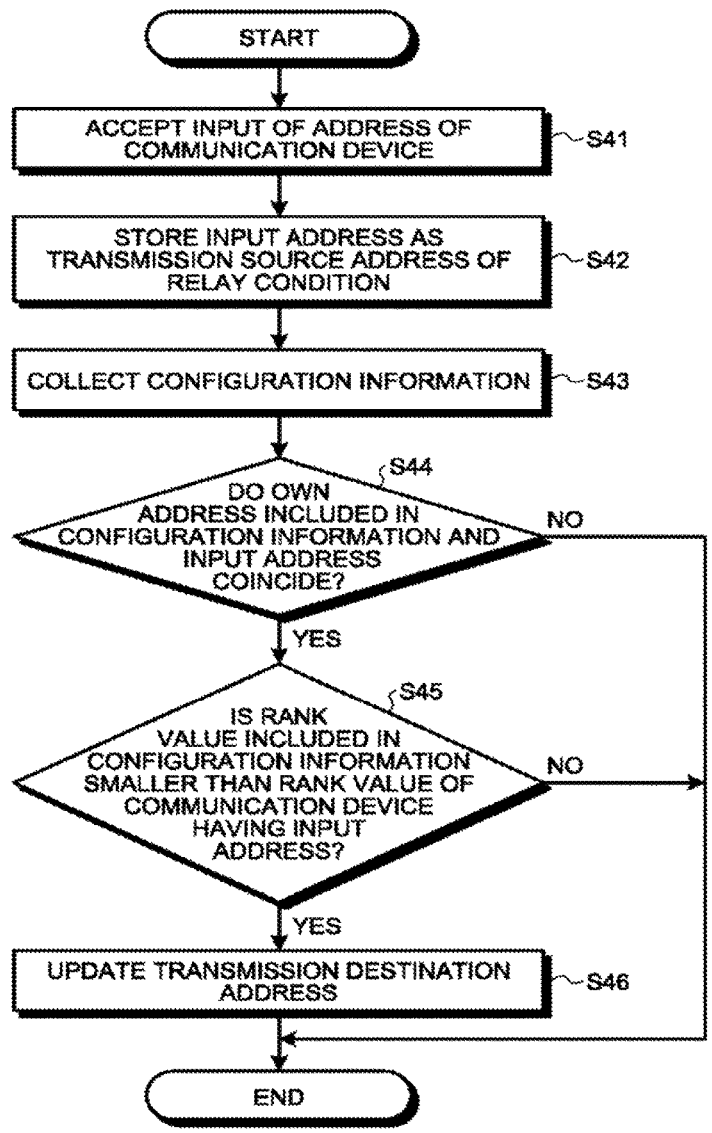
FIG. 12 is a flowchart illustrating an example of a process of generating a relay condition in the third embodiment.

FIG. 12 is a flowchart illustrating an example of the process of generating the relay condition in the third embodiment. First, the input unit 17 accepts the address input of the communication device 20 (Step S41). Next, the storage unit 16 stores the address accepted by the process of Step S41 as the transmission source address of the relay condition (Step S42).

Next, the collection unit 12 collects the configuration information indicating the configuration of the wireless multi-hop network from the communication device 20 (Step S43).

Next, the determination unit 13 determines whether the transmission source address of the relay condition stored by the process of Step S42 and the own address included in the configuration information collected by the process of Step S43 coincide (Step S44).

If the addresses do not coincide (No at Step S44), the process ends.

If the addresses coincide (Yes at Step S44), the determination unit 13 determines whether the rank value included in the configuration information is smaller than the rank value of the communication device 20 having the address input by the process of Step S41 (Step S45).

If the rank value included in the configuration information is smaller than the rank value of the communication device 20 having the address input by the process of Step S41 (Yes at Step S45), the determination unit 13 updates the transmission destination address of the relay condition to the address of the communication device 20 that has transmitted the configuration information (the own address included in the configuration information) (Step S46).

For example, description is made of the case in which cc:cc:cc:cc:cc:cc and dd:dd:dd:dd:dd:dd are input as the transmission source addresses as illustrated in FIG. 11, and the configuration information as illustrated in FIG. 3 is collected. In this case, the communication device 20b with cc:cc:cc:cc:cc:cc has a rank value of 1000. Moreover, the communication device 20c with dd:dd:dd:dd:dd:dd has a rank value of 1500. Therefore, the determination unit 13 updates the transmission destination address of the relay condition to the address of the communication device 20a that has transmitted the configuration information 201a having a rank value of 500 (the own address included in the configuration information 201a).

As described above, in the relay device 10 in the third embodiment, the input unit 17 accepts in advance the input of the address of the communication device 20 as the transmission source address of the relay condition. Thus, the wireless frame can be relayed without examining the parent-child relation of the plurality of communication devices 20 included in the wireless multi-hop network by the method described in the first embodiment.

Fourth Embodiment

Next, a fourth embodiment will be described. In the description of the fourth embodiment, the description similar to that of the second embodiment is omitted and the part different from the second embodiment will be described.

Functional Configuration of Relay Device

The functional configuration of the relay device 10 in the fourth embodiment is the same as the functional configuration of the relay device 10 in the second embodiment (see FIG. 9). However, the input unit 17 accepts the input indicating the parent-child relation of the communication devices 20 of two hops or more. The storage unit 16 stores the parent-child relation accepted by the input unit 17.

Example of Parent-child Relation Input

FIG. 13 illustrates an example of the parent-child relation input in the fourth embodiment. FIG. 13 illustrates the example in which the type of the input value is the address of the child and the address of the parent is specified as the value of that type. Even if the configuration information illustrated in FIG. 3 cannot be obtained, the determination unit 13 can determine whether to relay the wireless frame by using the parent-child relation illustrated in FIG. 13.

The determination unit 13 determines the address of the communication device 20 to be the transmission destination address on the basis of the parent-child relation of the communication devices 20, and determines the address of the one or more communication devices 20, which are not the direct child of the communication devices 20, to be the transmission source address. Then, the determination unit 13 generates the relay condition in which the determined transmission source address and the determined transmission destination address are associated with each other.

Process of Generating Relay Condition

FIG. 14 is a flowchart illustrating an example of the process of generating the relay condition in the fourth embodiment. First, the input unit 17 accepts the aforementioned parent-child relation input (see FIG. 13) of the communication devices 20 (Step S51). Next, the storage unit 16 stores the parent-child relation accepted by the process of Step S51 (Step S52).

Next, the determination unit 13 determines whether the configuration information indicating the configuration of the wireless multi-hop network has been successfully collected (Step S53).

If the collection of the configuration information has failed (No at Step S53), the determination unit 13 generates the relay condition on the basis of the parent-child relation of the communication devices 20 input by the process of Step S51 (Step S56).

On the other hand, if the collection of the configuration information has been successfully performed (Yes at Step S53), the determination unit 13 determines whether there is a difference between the parent-child relation of the communication devices 20 identified from the plurality of pieces of configuration information and the parent-child relation of the communication devices 20 accepted by the input unit 17 (Step S54).

If there is a difference (Yes at Step S54), the determination unit 13 generates the relay condition in a manner similar to the first embodiment on the basis of the parent-child relation of the communication devices 20 identified from the collected configuration information (Step S55).

Figure 15:
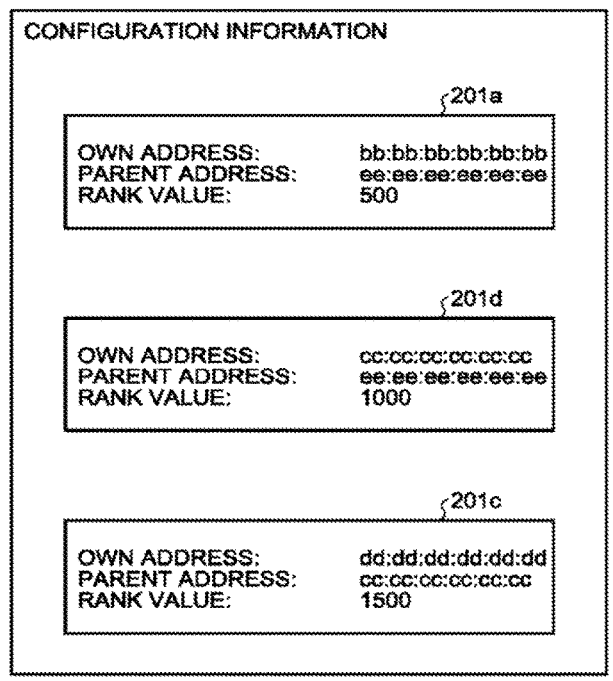
FIG. 15 is a diagram illustrating an example of configuration information in the fourth embodiment.

For example, in the case where the parent-child relation illustrated in FIG., 13 is input by the process of Step S51 and the configuration information illustrated in FIG. 15 is collected by the process of Step S53, there is a difference between the parent-child relation of the communication devices 20 specified from the configuration information illustrated in FIG. 15 and the parent-child relation illustrated in FIG. 13. Specifically, the parent address of the communication device 20b is bb:bb:bb:bb:bb:bb in FIG. 13 while that illustrated in FIG. 15 is ee:ee:ee:ee:ee:ee.

If there is no difference (No at Step S54), the determination unit 13 generates the relay condition on the basis of the parent-child relation of the communication devices 20 input by the process of Step S51 (Step S56).

For example, in the case where the parent-child relation illustrated in FIG. 13 is input by the process of Step S51 and the configuration information illustrated in FIG. 3 is collected by the process of Step S53, there is no difference between the parent-child relation of the communication devices 20 identified from the configuration information illustrated in FIG. 3 and the parent-child relation illustrated in FIG. 13.

As described thus, in the relay device 10 in the fourth embodiment, the input unit 17 accepts the input indicating the parent-child relation of the communication devices 20. Thus, even when the collection of the configuration information indicating the configuration of the wireless multi-hop network fails, the wireless frame can be relayed.

Fifth Embodiment

Next, a fifth embodiment will be described. In the description of the fifth embodiment, the description similar to that of the first embodiment is omitted and the part different from the first embodiment will be described. The fifth embodiment will describe a case in which the wireless frame is relayed by the plurality of relay devices 10.

Device Configuration of Communication System

Figure 16:
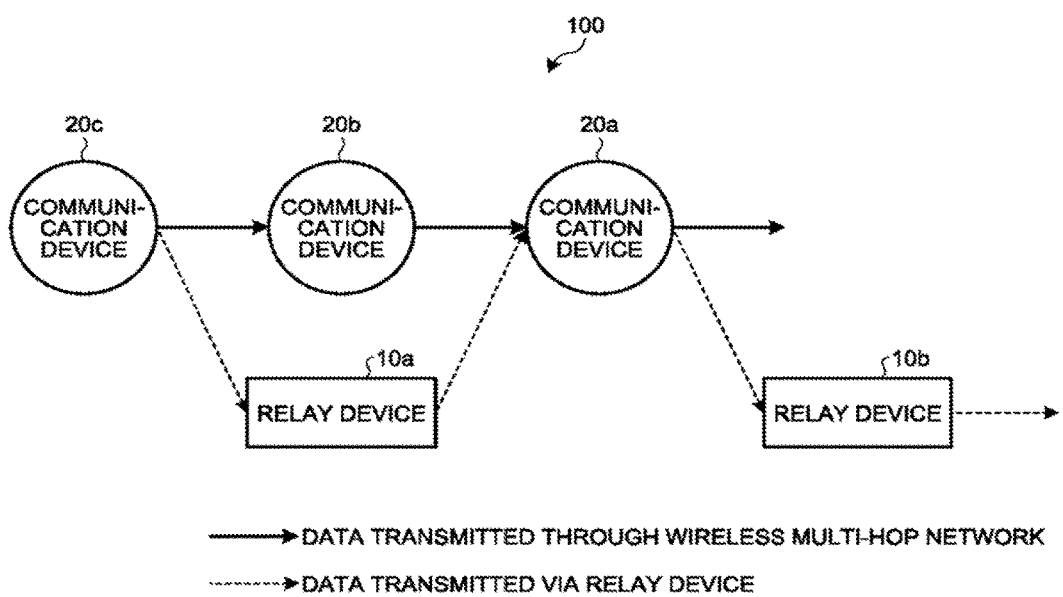
FIG. 16 is a diagram illustrating an example of a device configuration of a communication system according to a fifth embodiment.

FIG. 16 is a diagram illustrating a device configuration of the communication system 100 in the fifth embodiment. The communication system 100 in the fifth embodiment includes a plurality of relay devices 10 and a plurality of communication devices 20. The number of relay devices 10 and the number of communication devices 20 may be arbitrarily determined. In the example illustrated in FIG. 16, two relay devices 10a and 10b and three communication devices 20a to 20c are illustrated for explanation.

The example illustrated in FIG. 16 illustrates a case where a part of the relay condition of the relay device 10a and a part of the relay condition of the relay device 10b overlap. Specifically, the relay device 10a relays the wireless frame, which is transmitted from the communication device 20c, to the communication device 20a. The relay device 10b relays the wireless frame, which is transmitted from the communication device 20a, to the relay destination.

In the fifth embodiment, the relay device 10a receives the relay condition used in the relay device 10b from the relay device 10b. This enables the relay device 10a to identify that the wireless frame, which has been relayed by the relay device 10a, is further relayed by the relay device 10b.

In addition, the relay device 10b receives the relay condition used in the relay device 10a from the relay device 10a. This enables the relay device 10b to identify that the wireless frame, which has been relayed by the relay device 10a, is relayed to the communication device 20a.

In the example described in the fifth embodiment, the transmission destination of the wireless frame transmitted by the relay device 10a is set to the relay device 10b so as to enable the cooperation between the relay devices 10a and 10b.

The relay devices 10a and 10b are simply referred to as the relay devices 10 unless the devices need to be distinguished. The description of the functional configuration of the relay device 10 in the fifth embodiment is omitted because the function configuration is the same as the functional configuration of the relay device 10 in the first embodiment (see FIG. 2).

Relay Process

Figure 17:
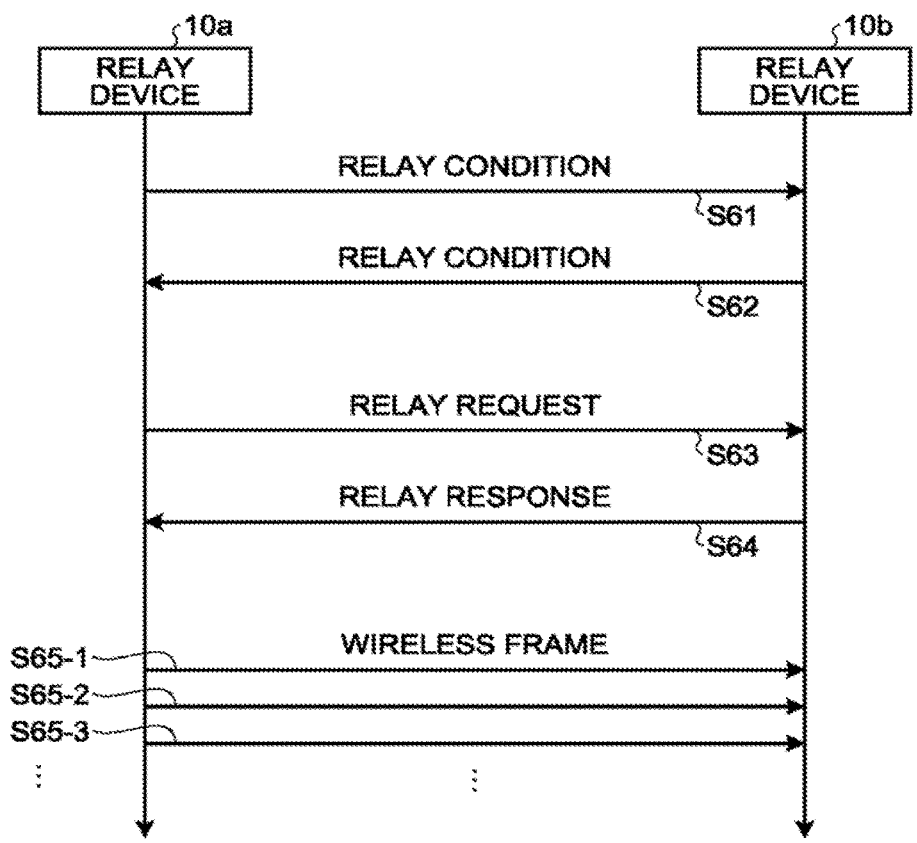
FIG. 17 is a sequence diagram illustrating an example of a relay process in the fifth embodiment.

FIG. 17 is a sequence diagram illustrating an example of the relay process in the fifth embodiment. First, the transmission unit 15 of the relay device 10a transmits the relay condition used in the relay device 10a to the relay device 10b (Step S61). Next, the transmission unit 15 of the relay device 10b transmits the relay condition used in the relay device 10b to the relay device 10a (Step S62).

Next, if the determination unit 13 of the relay device 10a has determined that the cooperation with the relay device 10b is possible, the transmission unit 15 of the relay device 10a transmits a relay request of the wireless frame to the relay device 10b (Step S63). Specifically, if the transmission source address included in the relay condition of the relay device 10b and the transmission destination address included in the relay condition of the relay device 10a coincide, the determination unit 13 of the relay device 10a determines that the cooperation with the relay device 10b is possible.

Next, the transmission unit 15 of the relay device 10b transmits to the relay device 10a, a relay response indicating whether to permit the relay request transmitted by the process of Step S63 (Step S64).

Next, if the relay response transmitted by the process of Step S64 indicates the permission of the relay request, the transmission unit 15 of the relay device 10a transmits the wireless frame to the relay device 10b (Step S65-1, Step S65-2, Step S65-3, . . . ).

Process of Updating Relay Condition

Figure 18:
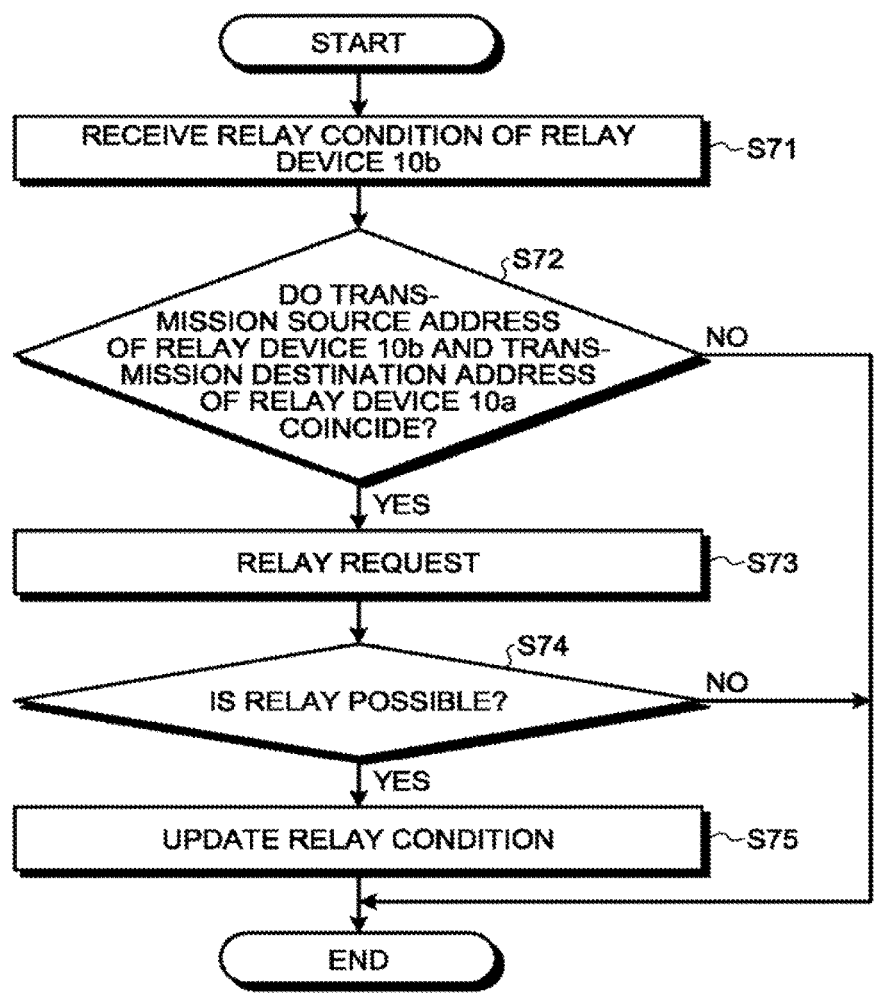
FIG. 18 is a flowchart illustrating an example of a process of updating a relay condition in the fifth embodiment.

FIG. 18 is a flowchart illustrating an example of a process of updating the relay condition in the fifth embodiment. In FIG. 18, an example will be described in which the relay device 10a transmits the relay request to the relay device 10b.

First, the reception unit 11 of the relay device 10a receives the relay condition used in the relay device 10b from the relay device 10b (Step S71).

Next, the determination unit 13 of the relay device 10a determines whether the transmission source address included in the relay condition of the relay device 10b and the transmission destination address included in the relay condition of the relay device 10a coincide (Step S72).

If the transmission source address included in the relay condition of the relay device 10b does not coincide with the transmission destination address included in the relay condition of the relay device 10a (No at Step S72), the process ends.

If the transmission source address included in the relay condition of the relay device 10b and the transmission destination address included in the relay condition of the relay device 10a coincide (Yes at Step S72), the transmission unit 15 of the relay device 10a transmits the relay request of the wireless frame to the relay device 10b (Step S73).

Next, the determination unit 13 of the relay device 10a determines whether the relay in cooperation with the relay device 10b is possible on the basis of the relay response of the relay request transmitted by the process of Step S73 (Step S74). For example, if the relay response indicates the permission of the relay request, the determination unit 13 of the relay device 10a determines that the relay in cooperation with the relay device 10b is possible.

If the relay in cooperation with the relay device 10b is possible (Yes at Step S74), the rewriting unit 14 of the relay device 10a updates the relay condition used in the relay device 10a (Step S75). Specifically, the rewriting unit 14 of the relay device 10a updates the transmission destination address included in the relay condition from the address of the communication device 20a to the address of the relay device 10b. Meanwhile, the rewriting unit 14 of the relay device 10b updates the transmission source address included in the relay condition from the address of the communication device 20a to the address of the relay device 10a.

If the relay in cooperation with the relay device 10b is not possible (No at Step S74), the process ends.

As described above, in the communication system 100 in the fifth embodiment, the plurality of relay devices 10 can relay the wireless frame as bypassing the communication device 20. Thus, the wireless frame can be relayed without increasing the number of hops and thus, the propagation delay, loss, and the like of the wireless frame can be suppressed.

Sixth Embodiment

Next, a sixth embodiment will be described. In the description of the sixth embodiment, the description similar to that of the second embodiment is omitted and the part different from the second embodiment will be described. The sixth embodiment describes an example in which the input unit 17 accepts the input of the control information for controlling the operation of the relay device 10 and relays the wireless frame on the basis of the control information.

FIG. 19A is a diagram illustrating an input example 1 of the control information in the sixth embodiment. FIG. 19A illustrates a case where the address input is accepted by the pair of the address value and "the transmission source address" expressing the type of input value, and the pair of the address value and "the transmission destination address" expressing the type of input value. In the example of FIG. 19A, dd:dd:dd:dd:dd:dd is input as the transmission source address and bb:bb:bb:bb:bb:bb is input as the transmission destination address.

FIG. 19B is a diagram illustrating an input example 2 of the control information in the sixth embodiment. In the example of FIG. 19B, dd:dd:dd:dd:dd:dd is input as the transmission source address and ee:ee:ee:ee:ee:ee is input as the transmission destination address.

Note that the input unit 17 may accept the input of the control information including one of the transmission source address and the transmission destination address. The control information may include the information other than the address. The control information may include, for example, the pair of the type that identifies the rank value and numerals that express the rank value of the communication device 20.

The description of the functional configuration of the relay device 10 in the sixth embodiment is omitted because the function configuration is the same as the functional configuration of the relay device 10 in the second embodiment (see FIG. 9). However, the input unit 17 accepts the input of the control information. The input unit 17 accepts the input of the control information from a different device, for example. The connection between the relay device 10 and the different device may be achieved by an arbitrary method. The relay device 10 and the different device may be connected through, for example, a wireless network. Alternatively, the relay device 10 and the different device may be connected through Ethernet (registered trademark), or the like.

The rewriting unit 14 updates the relay condition by rewriting at least one of the transmission source address and the transmission destination address in accordance with the control information.

Process of Updating Relay Condition

Figure 20:
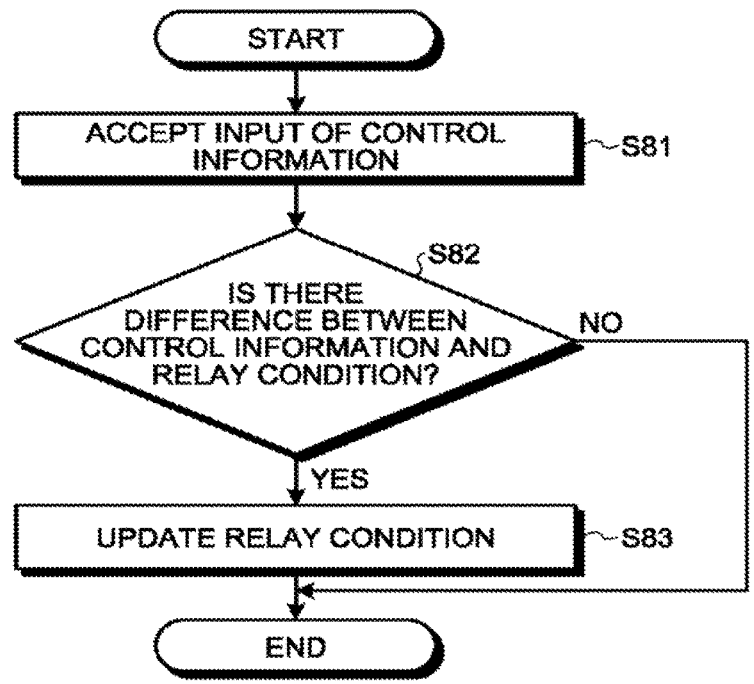
FIG. 20 is a flowchart illustrating an example of a process of updating a relay condition in the sixth embodiment.

FIG. 20 is a flowchart illustrating an example of a process of updating the relay condition in the sixth embodiment.

First, the input unit 17 accepts the input of the control information (see FIG. 19A and FIG. 19B, etc.) from the different device and the like (Step S81).

Next, the determination unit 13 determines whether there is a difference between the control information accepted in the process of Step S81 and the relay condition used in the relay device 10 (Step S82).

Specifically, if the control information includes the transmission destination address, for example, the determination unit 13 determines whether there is a difference between the transmission destination address included in the control information and the transmission destination address included in the relay condition.

In another example, if the control information includes the rank value of the communication device 20, the determination unit 13 determines whether the transmission destination address of the configuration information having the rank value smaller than the rank value included in the control information is included in the relay condition. If the transmission destination address of the configuration information having the rank value smaller than the rank value included in the control information is not included in the relay condition, the determination unit 13 determines that there is a difference between the control information and the relay condition.

In still another example, if the control information of FIG. 19A described above is input in a state that the aforementioned relay condition 202 of FIG. 4 has been generated from the configuration information of FIG. 3 described above, the rewriting unit 14 determines that there is no difference between the control information and the relay condition.

If there is no difference between the control information and the relay condition (No at Step S82), the process ends.

If there is a difference between the control information and the relay condition (Yes at Step S82), the rewriting unit 14 updates the relay condition using the control information (Step S83).

Specifically, if, for example, the control information includes the rank value of the communication device 20, the rewriting unit 14 rewrites the transmission destination address of the relay condition to the transmission destination address of the configuration information having the rank value smaller than the rank value included in the control information.

In another example, if the control information of FIG. 19B described above is input in a state that the aforementioned relay condition 202 of FIG. 4 has been generated from the configuration information of FIG. 3 described above, the rewriting unit 14 rewrites the transmission destination address bb:bb:bb:bb:bb:bb of the relay condition 202 to the transmission destination address ee:ee:ee:ee:ee:ee of the control information.

As described above, in the relay device 10 in the sixth embodiment, the input unit 17 accepts the input of the control information from the different device and the like. Thus, by the relay device 10 in the sixth embodiment, the process of relaying the wireless frame from the different device and the like by the relay device 10 can be controlled.

Example of Hardware Configuration

Finally, description is made of an example of a hardware configuration of the relay device 10 and the communication device 20 in the first to the sixth embodiments.

Figure 21:
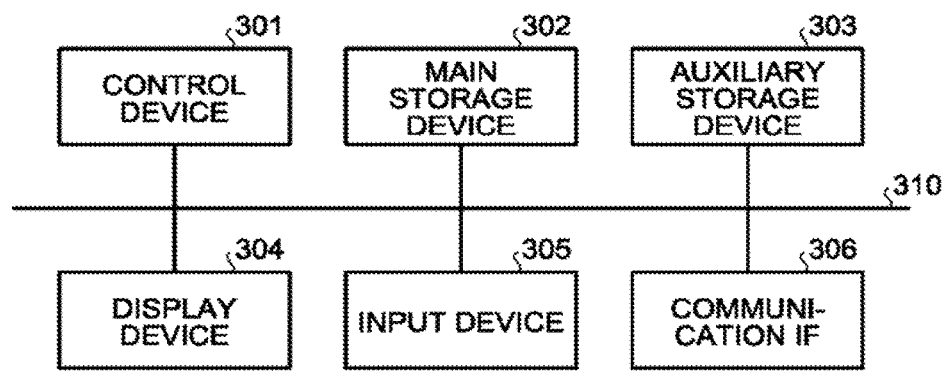
FIG. 21 is a diagram illustrating an example of a hardware configuration of a main part of the relay device and a communication device in the first to the sixth embodiments.

FIG. 21 is a diagram illustrating an example of the hardware configuration of a main part of the relay device 10 and the communication device 20 in the first to the sixth embodiments. The description of the hardware configuration of the main part of the communication device 20 is similar to that to the hardware configuration of the main part of the relay device 10; thus, an example in the case of the relay device 10 is described.

The relay device 10 in the first to the sixth embodiments includes a control device 301, a main storage device 302, an auxiliary storage device 303, a display device 304, an input device 305, and a communication IF 306. The control device 301, the main storage device 302, the auxiliary storage device 303, the display device 304, the input device 305, and the communication IF 306 are connected to each other through a bus 310.

The control device 301 executes programs read out from the auxiliary storage device 303 to the main storage device 302. The main storage device 302 is a memory such as a read only memory (ROM) or a random access memory (RAM). The auxiliary storage device 303 is a memory card, a hard disk drive (HDD), or the like.

The display device 304 displays information. The display device 304 is, for example, a liquid crystal panel. The input device 305 accepts the input of information. The input device 305 is, for example, a hardware key or the like. Note that the display device 304 and the input device 305 may be a liquid crystal touch panel having both the display function and the input function, for example. The communication IF 306 is the interface that communicates with another device.

Note that the display device 304 and the input device 305 may be omitted from the relay device 10. For example, if the relay device 10 does not have the input device 305, the input of the information such as the aforementioned control information is accepted from another device through the communication IF 306.

The programs to be executed by the relay device 10 in the first to the sixth embodiments are stored in a computer-readable storage medium such as a CD-ROM, a memory card, a CD-R, or a digital versatile disc (DVD) in the installable format or the executable format, and provided as a computer program product.

The programs to be executed by the relay device 10 in the first to the sixth embodiments may be stored in a computer connected to the network such as the Internet and provided by being downloaded via the network. Alternatively, the programs to be executed by the relay device 10 in the first to the sixth embodiments may be provided via the network such as the Internet without downloading.

The programs to be executed by the relay device 10 in the first to the sixth embodiments may be provided by being embedded in the ROM or the like.

In regard to the programs to be executed by the relay device 10 in the first to the sixth embodiments, the functional configurations of the relay device 10 in the first to the sixth embodiments in the module configuration include the function that can be achieved by the programs.

The functions achieved by the programs are loaded to the main storage device 302 when the control device 301 reads out the programs from the auxiliary storage device 303 or the like and executes the programs. In other words, the function achieved by the programs is generated on the main storage device 302.

The functions of the relay device 10 in the first to the sixth embodiments may be achieved by the hardware such as an integrated circuit (IC) either partly or entirely.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A relay device comprising:
    a reception unit implemented by circuitry and configured to receive a wireless frame transmitted between a plurality of communication devices forming a wireless multi-hop network;
    a collection unit implemented by the circuitry and configured to collect configuration information indicating a configuration of the wireless multi-hop network from the communication devices;
    a determination unit implemented by the circuitry and configured to determine whether to relay the wireless frame on the basis of the configuration information;
    a rewriting unit implemented by the circuitry and configured to, in response to the wireless frame being relayed, rewrite a transmission destination address of the wireless frame to an address of the communication device of a relay destination specified on the basis of the configuration information, and rewrite a transmission source address of the wireless frame to an address of the own device; and
    a transmission unit implemented by the circuitry and configured to transmit the wireless frame rewritten by the rewriting unit, wherein
    the determination unit determines a first transmission source address and a first transmission destination address associated with the first transmission source address on the basis of a plurality of pieces of configuration information, and in response to the transmission source address of the wireless frame coinciding with the first transmission source address, the determination unit determines to relay the wireless frame to the first transmission destination address,
    the configuration information includes a rank value indicating a relay cost, and
    the determination unit determines lines an address of a first communication device that has transmitted the configuration information including a minimum rank value among the plurality of pieces of configuration information, to be the first transmission destination address, and determines an address of one or more second communication devices that are not a direct child of the first communication device, to be the first transmission source address.

2. The device according to claim 1, further comprising an input unit configured to accept an input of the rank value, wherein
    the determination unit determines an address of a first communication device that has transmitted the configuration information including a rank value smaller than the rank value input through the input unit, to be the first transmission destination address, and determines an address of a second communication device that has transmitted the configuration information including a rank value larger than the rank value input through the input unit, to be the first transmission source address.

3. The device according to claim 2, wherein when the wireless frame is to be relayed, the rewriting unit rewrites the transmission destination address of the wireless frame to the address of the first communication device.

4. The device according to claim 1, wherein, in response to a number of pieces of configuration information collected by the collection unit being one, the determination unit determines that it is impracticable to relay the wireless frame.

5. The device according to claim 1, wherein, in response to a number of pieces of configuration information collected by the collection unit being more than one and there is no communication device that is not a direct child of the first communication device, the determination unit determines that it is impracticable to relay the wireless frame.

6. The device according to claim 1, further comprising an input device configured to accept an input of the transmission source address, wherein
    the determination unit determines an address of a first communication device that has transmitted the configuration information including the rank value smaller than a rank value of a communication device having an address coinciding with the transmission source address input through the input unit, to be the first transmission destination address, and determines the transmission source address input through the input unit, to be the first transmission source address.

7. The device according to claim 1, further comprising an input unit configured to accept an input of a parent-child relation of the communication devices, wherein the determination unit determines, in response to collection of the configuration information failing, an address of a first communication device to be the first transmission destination address, and determines an address of one or more second communication devices that are not a direct child of the first communication device, to be the first transmission source address on the basis of the parent-child relation of the communication devices.

8. The device according to claim 1, wherein the reception unit receives a second transmission source address and a second transmission destination address associated with the second transmission source address from another relay device; and in response to the second transmission source address and the first transmission destination address coinciding, the rewriting unit rewrites the first transmission destination address to an address of the another relay device.

9. The device according to claim 1, further comprising an input device configured to accept an input of control information for controlling an operation of the relay device, wherein the rewriting unit rewrites at least one of the first transmission source address and the first transmission destination address in accordance with the control information.

10. A communication system comprising a relay device and a plurality of communication devices, the relay device comprising:

a reception unit implemented by circuitry and configured to receive a wireless frame transmitted between the plurality of communication devices forming a wireless multi-hop network;

a collection unit implemented by the circuitry and configured to collect configuration information indicating a configuration of the wireless multi-hop network from the communication devices;

a determination unit implemented by the circuitry and configured to determine whether to relay the wireless frame on the basis of the configuration information;

a rewriting unit implemented by the circuitry and configured to, when the wireless frame is to be relayed, rewrite a transmission destination address of the wireless frame to an address of the communication device of a relay destination specified on the basis of the configuration information and rewrite a transmission source address of the wireless frame to an address of the own device; and a transmission unit implemented by the circuitry and configured to transmit the wireless frame rewritten by the rewriting unit, wherein the determination unit determines a first transmission source address and a first transmission destination address associated with the first transmission source address on the basis of a plurality of pieces of configuration information, and in response to the transmission source address of the wireless frame coinciding with the first transmission source address, the determination unit determines to relay the wireless frame to the first transmission destination address, the configuration information includes a rank value indicating a relay cost, and the determination unit determines an address of a first communication device that has transmitted the configuration information including a minimum rank value among the plurality of pieces of configuration information, to be the first transmission destination address, and determines an address of one or more second communication devices that are not a direct child of the first communication device, to be the first transmission source address.

11. A non-transitory computer readable medium including programmed instructions stored therein that, when executed by a relay device having processing circuitry, cause the processing circuitry to perform a relaying method, the method comprising:

receiving, at a reception unit, a wireless frame transmitted between a plurality of communication devices forming a wireless multi-hop network;

collecting configuration information indicating a configuration of the wireless multi-hop network from the communication devices;

determining whether to relay the wireless frame on the basis of the configuration information;

rewriting, in response to the wireless frame being relayed, a transmission destination address of the wireless frame to an address of the communication device of a relay destination specified on the basis of the configuration information, and rewriting a transmission source address of the wireless frame to an address of the own device; and transmitting the rewritten wireless frame, wherein the determining determines a first transmission source address and a first transmission destination address associated with the first transmission source address on the basis of a plurality of pieces of configuration information, and in response to the transmission source address of the wireless frame coinciding with the first transmission source address, the determining determines to relay the wireless frame to the first transmission destination address, the configuration information includes a rank value indicating a relay cost, and the determining determines an address of a first communication device that has transmitted the configuration information including a minimum rank value among the plurality of pieces of configuration information, to be the first transmission destination address, and determines an address of one or more second communication devices that are not a direct child of the first communication device, to be the first transmission source address.

* * * * *